United States Patent Office 3,078,841
Patented Feb. 26, 1963

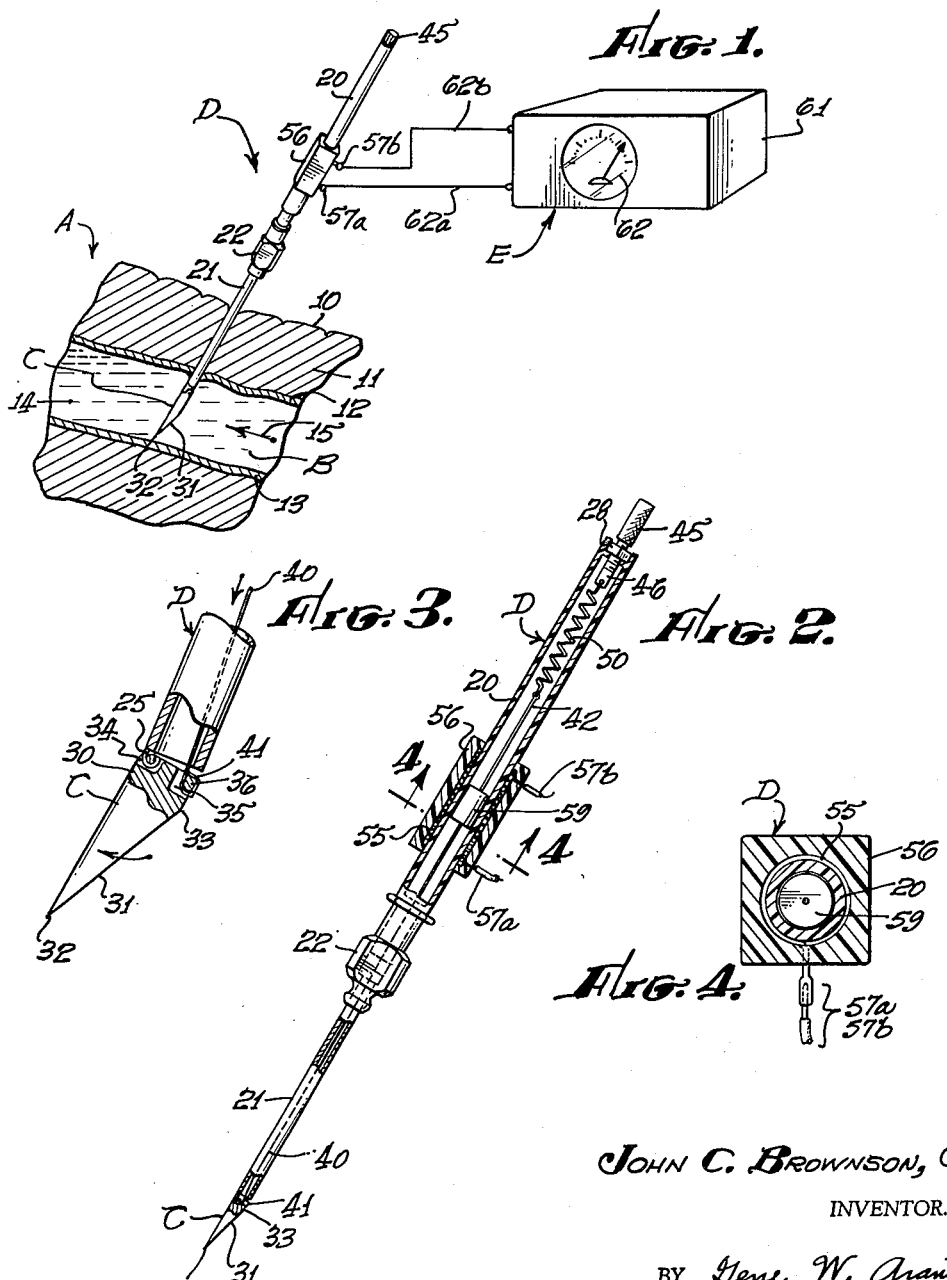

3,078,841
RATE-OF-BLOOD FLOW MEASURING DEVICE
John C. Brownson, Jr., Twentynine Palms, Calif.
(558 East, 6300 South, Bountiful, Utah)
Filed July 14, 1958, Ser. No. 748,516
4 Claims. (Cl. 128—2.05)

The present invention relates to a medical instrument for providing a continuous indication of the rate of flow of blood in a human blood vessel.

In diagnosing and treating conditions of the cardiac system it is generally necessary to be able to measure the rate of flow of the blood. More specifically, it is often desirable to measure the rate of flow in a specified vein or artery as distinguished from a mere average rate of flow for the entire circulatory system.

Methods which have been used heretofore in accomplishing the above purposes have been devious and cumbersome. Furthermore, the previously used methods have provided a rate of flow measurement for a particular interval of time but have not provided a continuous indication, which is often desirable.

An object of the invention, therefore, is to provide a medical instrument for measuring directly the rate of flow of blood in a human blood vessel.

Another object of the invention is to provide a medical instrument capable of continuously measuring and indicating the rate of flow of blood at a single specified point in the circulatory system.

In accordance with the present invention a sensing element mounted on a suitable supporting member is inserted into the blood vessel at the point where the measurement is to be taken. Electronic circuitry forming a part of the instrument and responsive to deflection of the sensing element then provides a continuous indication of the rate of blood flow.

The above and other objects of the invention will be more readily understood in view of the following description taken in conjunction with the accompanying drawing, in which:

FIGURE 1 is a perspective view of the novel instrument of the present invention, showing in cross section a human blood vessel into which the instrument has been inserted;

FIGURE 2 is a longitudinal cross-sectional view of the instrument exclusive of the electronic indicating equipment;

FIGURE 3 is an enlarged perspective view, partially in cross-section, of the sensing element and forward end of the shank of the instrument;

FIGURE 4 is an enlarged transverse cross-sectional view of the shank of the instrument taken on line 4—4 of FIGURE 2.

Since my novel instrument may be used either in a vein or an artery it is to be understood that the term "blood vessel" refers to both. It will also be pointed out in the latter part of the description how the instrument can be advantageously used without actually being inserted into a human blood vessel.

Referring now to the drawing it will be seen that a portion of human anatomy A includes a blood vessel B into which the sensing element C of the instrument has been inserted. Sensing element C is supported at the forward end of shank D, and electronic indicating circuitry E is in turn connected to the main body portion of shank D.

The illustrated portion of anatomy A includes a layer of skin 10 and flesh 11 beneath which lies an arterial wall 12 on the upper side of blood vessel (artery) B. The lower arterial wall is designated by reference numeral 13. Blood 14 which fills the artery is flowing from right to left as indicated by arrow 15.

Shank D includes a main body section 20 which is in the form of an elongated hollow cylindrical tube. Body section 20 may conveniently be made of transparent plastic material to permit viewing the internal operation of the device. Shank D also includes a forward section 21 which is likewise in the form of an elongated hollow cylindrical tube but having a smaller diameter (both internal and external) than does main body section 20. Section 21 of shank D is preferably made of metal. Sections 20 and 21 are longitudinally concentrically aligned and are fastened together by means of an adapter unit 22 which snugly engages the outer surfaces of the associated end portions of sections 20 and 21.

Sensing element C has a cylindrical base portion 30 whose outer diameter is substantially the same as the outer diameter of forward section 21 of shank D. Sensing element C also has a longitudinal thrust surface 31 which at one end adjoins base portion 30 and at its other end defines a sharp point or tip 32. Sensing element C is preferably formed from a solid cylindrical member which is then cut along a plane which intersects a point on the circular perimeter of the forward end of the cylinder (which point, after cutting, provides the tip 32), and which also intersects a point 33 on the outer surface of the cylinder near its other end and 180° removed from point 32 (thus leaving cylindrical base portion 30 in its original form). A hinge portion 34 is provided in base portion 30 of element C at its exterior end and is located on the same side of the sensing element as tip 32 but opposite from intercept point 33. On the other side of base portion 30 a passageway 35 is formed which extends from the outer surface of base portion 30 adjacent intercept point 33 to the end surface of base portion 30. Base portion 30 and passageway 35 when viewed in cross section as in FIGURE 3 delineate a transverse connecting member 36 whose use will be explained.

The forward end of forward section 21 of shank D carries a mating hinge portion 25 to which hinge portion 34 of the sensing element is fastened. A tension wire 40 which extends longitudinally within shank D has an end portion 41 which is wrapped around connecting member 36 of sensing element C. The flow of blood 14 in blood vessel B imposes a kinetic thrust upon thrust surface 31 causing sensing element C to rotate clockwise (as viewed in FIGURES 1 and 3) relative to shank D. This displacement of sensing element C in turn imposes tensile stress upon tension wire 40.

Main body section 20 of shank D has its upwardly disposed end closed off by a rear closure member 28 which is inserted therein. Closure member 28 is preferably a cylindrical washer made of plastic and having a concentric threaded bore adapted to receive adjusting screw 45. Adjusting screw 45 has a forward end portion 46 which extends within the upper end of main shank section 20. A tension spring 50 positioned longitudinally within the upper portion of shank section 20 has one of its ends fastened to end portion 46 of the adjusting screw and its other end fastened to upper end portion 42 of tension wire 40.

The above described arrangement permits adjusting the static tension of spring 50 by changing the setting of adjusting screw 45, so that a given rate of blood flow will produce a desired deflection of sensing element C and hence a desired longitudinal deflection of tension wire 40 within shank D.

The electrical circuitry which is provided for measuring the deflection of tension wire 40 will now be described.

At about the middle of main body section 20 of shank

D an electrical coil 55 is wound about the exterior surface of the shank. A cylindrical plastic case 56 surrounds coil 55 and holds it firmly in position, with lead wires 57a, 57b protruding therefrom. A small cylindrical plug 59 made of an electrically conductive metal is concentrically mounted on tension wire 40 so as to move longitudinally therewith, plug 59 being normally positioned at the exact center of electrical coil 55. Thus, the flow of blood in vessel B deflects sensing element C, which in turn deflects tension wire 40 and plug 59, and the movement of plug 59 relative to the coil varies the effective electrical inductance of coil 55.

Indicating circuitry E is mounted in a suitable housing 61 to which electrical energy is supplied by conventional means, not shown. Connecting leads 62a, 62b connect the ends of coil 55 to housing 61. An indicator dial 62 mounted on the front of housing 61 provides a continuous indication of the rate of blood flow.

While the electronic circuitry may assume any of several conventional forms I prefer to use an oscillator in which coil 55 is included as an integral part. Variation in the coil inductance produces a corresponding change in the oscillating frequency, the frequency change being detected and indicated on the dial by conventional circuitry which need not be described in detail here.

As an illustration of the sensitivity of the present invention and the change of position required of the plug 59 in response to flow forces on the sensing element C, if the oscillator is operated at a normal frequency of 100 megacycles, movement of the plug through 25 one-millionths of an inch will cause a frequency change of approximately 1000 cycles. A change of this magnitude is easily discernible on the indicator 62.

Not only may my invention be used in conjunction with a human blood vessel but it may also be advantageously employed as follows. Medical treatment sometimes requires the use of a simulated heart which produces circulation of the blood while the genuine heart is isolated for purpose of surgery or other treatment. The output from the simulated heart is generally supplied through a flexible tube to the body of the patient. My novel instrument may advantageously be used by inserting same through the wall of the flexible tube for measuring the rate of flow of blood therein. The sensing element C acts not only in this capacity, but also is of such configuration that when a force is applied thereto, the element passes through the wall of a blood vessel into the confines thereof as shown in FIGURE 1. The element C is shorter than the internal diameter of the smallest blood vessel in which it will be used, and can accordingly pivot therein.

Although my invention is fully capable of achieving the results and providing the advantages hereinbefore mentioned, it is to be understood that it is merely the presently preferred embodiment thereof, and that I do not mean to be limited to the details of construction above described other than as defined in the appended claims.

I claim:
1. A medical instrument for use in measuring the rate of flow of blood in a blood vessel, comprising:
   (a) a tapered thrust-sensing element adapted to be forced through the wall of a blood vessel into the interior thereof, which element is shorter than the interior diameter of the smallest blood vessel on which it will be used, with said element having a first end portion of substantially circular transverse cross section;
   (b) a tubular shank;
   (c) first means for pivotally connecting said first end portion to a lower end of said shank;
   (d) a tension wire connected to said first end portion and extending longitudinally upwardly in said shank;
   (e) second means for exerting a tension on said wire;
   (f) third means on said shank for varying the magnitude of the tension exerted by said second means on said wire to permit said element to pivot relative to said shank only when the blood in said vessel is flowing at such a rate that it exerts a thrust on said element that is greater than the tensional force exerted by said wire thereon; and
   (g) fourth means for indicating to the user that said element has pivoted relative to said shank.

2. A medical instrument as defined in claim 1 wherein said second means is a coiled spring under tension that is disposed within the confines of said shank.

3. A medical instrument as defined in claim 2 wherein said third means includes:
   (a) a rigid member that closes the upper end of said shank, which rigid member has a tapped bore formed therein;
   (b) a screw threadedly mounted in said tapped bore, with the lower end of said screw being connected to the upper end of said spring; and
   (c) means for rotating said screw to adjust the tension on said spring and said wire.

4. An instrument as defined in claim 2 wherein said fourth means includes:
   (a) an electrical conducting plug mounted on said wire and disposed within the confines of said shank; and
   (b) electrical means on the exterior of said shank for indicating when said plug moves longitudinally relative to said shank due to said wire being moved as said element pivots relative to said shank.

References Cited in the file of this patent

UNITED STATES PATENTS 2,708,928     Zenati _____ May 24, 1955

FOREIGN PATENTS 1,042,204     France _____ June 3, 1953